United States Patent [19]

Baig

[11] Patent Number: 5,320,677
[45] Date of Patent: Jun. 14, 1994

[54] COMPOSITE MATERIAL AND METHOD OF PRODUCING

[75] Inventor: Mirza A. Baig, Des Plaines, Ill.

[73] Assignee: United States Gypsum Company, Chicago, Ill.

[21] Appl. No.: 774,175

[22] Filed: Oct. 15, 1991

Related U.S. Application Data

[63] Continuation of Ser. No. 273,416, Nov. 18, 1988, abandoned.

[51] Int. Cl.$^5$ .......................... B32B 13/02; C01D 5/00
[52] U.S. Cl. ..................................... 106/780; 106/772; 156/42; 423/555; 428/703
[58] Field of Search ................ 106/772, 778, 779, 780; 156/42; 423/172, 402, 555; 264/87, 122; 162/187, 225, 181.3, 183; 428/703

[56] References Cited

U.S. PATENT DOCUMENTS

| | | | |
|---|---|---|---|
| 1,907,080 | 5/1933 | McMillan | 106/605 |
| 3,822,340 | 6/1976 | Eberl et al. | 427/220 |
| 3,951,735 | 4/1976 | Kondo et al. | 162/133 |
| 3,961,105 | 6/1976 | Ebert et al. | 427/220 |
| 4,152,408 | 5/1979 | Winslow | 423/555 |
| 4,239,716 | 12/1980 | Ishida et al. | 264/86 |
| 4,328,178 | 5/1982 | Kossatz | 264/69 |
| 4,392,896 | 7/1983 | Sakakibara | 159/39 |
| 4,645,548 | 2/1987 | Take et al. | 156/39 |
| 4,734,163 | 3/1988 | Eeberhardt et al. | 162/181.3 |
| 4,840,688 | 6/1988 | Vogt | 106/780 |

FOREIGN PATENT DOCUMENTS 232341 4/1928 United Kingdom.

OTHER PUBLICATIONS

*Pit and Quarry*, "Fundamentals of Gypsum Calcination", Apr. 1952 pp. 113–114, 118–123.

*Ullmans Encyclopedia*, "Calcium Sulfate" by Wirsching, vol. A4 pp. 555–584, no date.
*Kirk Othmer Encyclopedia*, "Calcium Compounds" by Hammond, 2d, vol. 4, pp. 14–27 no date.
*The Encyclopedia of Chemistry*, 3rd Ed, Hampel et al, 1973, p. 170.
"Gypsum Fibre Boards for the dry interior finish construction" Reprint from Holz-Zentralblatt vol. III, No. 11, Jan. 25, 1985.
Siemplelkamp "Plants for the Production of Gypsum Fiber Board" Date not shown.
"Bisonsystem—Gypsum Fiberboards Plants" publication of Bison Werke D-3257 Springe 1.
E. Frick, "Commissioning and operating experience at a gypsum calcining and gypsum chipboard plant. Part II Gypsum Chipboard Plant." Translation ZKG No. 7/88 (pp. 334–338) from German.

*Primary Examiner*—Michael Lewis
*Assistant Examiner*—Stephen G. Kalinchak
*Attorney, Agent, or Firm*—John M. Lorenzen; Robert H. Robinson

[57] ABSTRACT

An improved composite material is produced by mixing gypsum and host particles of a stronger substance, such as wood fibers, in a dilute slurry; heating the slurry, under pressure, to convert the gypsum to calcium sulfate alpha hemihydrate; and substantially dewatering the hot slurry before rehydrating the hemihydrate back to gypsum. The resulting material is a homogeneous mass comprising gypsum crystals physically interlocked with the discrete host particles.

According to a further aspect of the invention, an improved wallboard, having fire resistance, dimensional stability and excellent strength properties, is produced by compressing the composite mass before hydrating it to a final set.

35 Claims, 11 Drawing Sheets

COMPOSITE MATERIAL AND METHOD OF PRODUCING

This is a continuation of co-pending application Ser. No. 273,416 filed on Nov. 18, 1988 now abandoned.

FIELD OF THE INVENTION

The invention relates to a new composite material; more particularly, to a composite gypsum/cellulose-fiber material especially useful for making building and plaster products; and still more particularly, to a fire-resistant, composite gypsum/wood-fiber board.

BACKGROUND AND PRIOR ART

Certain properties of gypsum (calcium sulfate dihydrate) make it very popular for use in making industrial and building plasters and other building products; especially gypsum wallboard. It is a plentiful and generally inexpensive raw material which, through a process of dehydration and rehydration, can be cast, molded or otherwise formed to useful shapes. It is also noncombustible and relatively dimensionally stable when exposed to moisture. However, because it is a brittle, crystalline material which has relatively low tensile and flexural strength, its uses are typically limited to non-structural, non-load bearing and non-impact absorbing applications.

Gypsum wallboard; i.e. also known as plasterboard or drywall, consists of a rehydrated gypsum core sandwiched between multi-ply paper cover sheets, and is used largely for interior wall and ceiling applications. The paper cover sheets contribute significantly to the strength of plasterboard, but, in doing so, compromise its fire resistance. Furthermore, because of the brittleness and low nail and screw holding properties of its gypsum core, conventional drywall by itself cannot support heavy appended loads or absorb significant impact.

Accordingly, means to improve the tensile, flexural, nail and screw holding strength and impact resistance of gypsum plasters and building products have long been, and still are, earnestly sought.

Another readily available and affordable material, which is also widely used in building products, is ligno-cellulosic material, particularly in the form of wood and paper fibers. For example, in addition to lumber, particleboard, fiberboard, waferboard, plywood and hardboard (high density fiberboard) are some of the forms of processed ligno-cellulosic material products used in the building industry. Such materials have better tensile and flexural strength than gypsum. However, they are also generally higher in cost, have poor fire resistance and are frequently susceptible to swelling or warping when exposed to moisture. Therefore, affordable means to improve upon these use limiting properties of building products made from cellulosic material are also desired.

Previous attempts to combine the favorable properties of gypsum and cellulosic fibers, particularly wood fibers, have had very limited success. Attempts to add cellulosic fibers, (or other fibers for that matter), to gypsum plaster and/or plasterboard core have generally produced little or no strength enhancement because of the heretofore inability to achieve any significant bond between the fibers and the gypsum. U.S. Pat. Nos. 4,328,178; 4,239,716; 4,392,896; and 4,645,548 disclose recent examples where wood fibers, or other natural fibers, were mixed into a stucco (calcium sulfate hemihydrate) slurry to serve as reinforcers for a rehydrated gypsum board or the like. Similarly, attempts to add gypsum particles to wood fiber products have been disappointing due to the inability to retain enough gypsum in the product to materially improve the fire-resistance or dimensional stability of the base material.

Recently, several manufacturers have had limited success in producing board products comprising a combination of gypsum and wood, or paper fibers. In several of these processes, calcined gypsum (stucco) is mixed with wood or paper fibers and water to make a slurry, then pressed while, or before, the stucco rehydrates to solidified gypsum.

In one such process (Prior Art Process A) waste paper is mixed with stucco in an aqueous slurry which is discharged onto a felting conveyor and dewatered. The thin hemihydrate/paper cake is wound convolutely onto a cylinder, to build up a board thickness, then cut to length. The green felts are stacked on carts between sheets of hardboard and allowed to hydrate over about a 3 to 4 hour period. The set boards are then dried, trimmed, and sanded and sealed as necessary.

In a so-called "semi-dry" process (Prior Art Process B) stucco and waste paper are mixed together dry. Part of the water needed for rehydration is added in a second mixer, and the mixed material formed into various layers on a continuous running belt. The remainder of the required water is sprayed onto the several layers which are then combined into a multi-layer mat prior to entering a continuous press. After the initial "set", the raw boards are cut and trimmed, allowed to "fully set" on a holding belt, and then dried.

In another so-called "semi-dry" process (Prior Art Process C) stucco and wood flakes are pre-mixed dry. Water, in the form of ice or snow crystals is metered into the mix, which is then spread onto an endless mat on the bottom of a continuous press. The ice melts slowly after compression of the mat to the desired thickness and then hydration takes place. After the board finally sets, it is cut, trimmed and dried. Sanding is probably also desirable, if not necessary.

Examination of commercial boards from these processes reveals that they consist of a compacted mixture of discrete gypsum and fiber materials, i.e. they are more a physical mix than a homogeneous composite. While it might be said that the gypsum provides, or serves as, a binder for the fibers in these boards, it does not appear that there is any appreciable direct physical interlocking or chemical bonding between the gypsum crystals and the fibers. Furthermore, whether because of the way in which these boards are formed, or because of the mechanical mixing of gypsum crystals and fibers, and/or because of the clumping of the paper fibers or stucco, these boards do not exhibit good homogeniety and uniformity of properties; i.e. such as density and strength, over their expanse.

According to a process (Prior Art Process D) described in recently issued U.S. Pat. No. 4,734,163, raw or uncalcined gypsum is finely ground and wet mixed with 5-10% paper pulp. The mash is partially dewatered, formed into a cake and further dewatered by pressure rolls until the water/solids ratio is less than 0.4. The cake is cut into green boards, which, after being trimmed and cut, are stacked between double steel plates and put into an autoclave. The temperature in the autoclave is raised to about 140° C. to convert the gypsum to calcium sulfate alpha hemihydrate. During the subsequent incremental cooling of the vessel boards, the hemihydrate rehydrates back to dihydrate (gypsum) and gives the board integrity. The boards are then dried and finished as necessary.

This process is distinguisable from the earlier ones in that the calcination of the gypsum takes place in the presence of the paper fibers.

SUMMARY OF THE INVENTION

It is a principal objective of the present invention to provide a composite material, which combines gypsum with another substance having higher strength, such as a wood fiber, for use in making stronger cast products, plasters, building products and for other applications.

It is a related objective to provide a process for producing such a composite material.

A more specific objective of the invention is to provide a paperless wallboard comprised of the composite material, which is homogeneous; which has uniformly good strength, including resistance to nail and screw pull-out, throughout its expanse; which is more dimensionally stable and maintains its strength even in a humid environment; which is fire resistant; and which can be produced at a practical cost.

A further specific objective is to provide a process for economically producing the aforedescribed wallboard.

The main objectives are realized, according to the invention in its broadest sense, by calcining ground gypsum under pressure in a dilute slurry in the presence of a host particle of a stronger material.

The term "gypsum", as used herein, means calcium sulfate in the stable dihydrate state; i.e. $CaSO_4.2H_2O$, and includes the naturally occurring mineral, the synthetically derived equivalents, and the dihydrate material formed by the hydration of calcium sulfate hemihydrate (stucco) or anhydrite.

The term "host particle" is meant to cover any macroscopic particle, such as a fiber, a chip or a flake, of a substance other than gypsum. The particle, which is generally insoluble in the slurry liquid, should also have accessible voids therein; whether pits, cracks, fissures, hollow cores, or other surface imperfections, which are penetrable by the slurry menstruum and within which calcium sulfate crystals can form. It is also desirable that such voids are present over an appreciable portion of the particle; it being apparent that the more and better distributed the voids, the greater and more geometrically stable will be the physical bonding between the gypsum and host particle. The substance of the host particle should have desirable properties lacking in the gypsum, and, preferably, at least higher tensile and flexural strength. A ligno-cellulosic fiber, particularly a wood fiber, is an example of a host particle especially well suited for the composite material and process of the invention. Therefore, without intending to limit the material and/or particles that qualify as a "host particle", wood fiber(s) is often used hereafter for convenience in place of the broader term.

The uncalcined gypsum and host particle are mixed together with sufficient liquid to form a dilute slurry which is then heated under pressure to calcine the gypsum, converting it to a calcium sulfate alpha hemihydrate. While the micro-mechanics of the invention are not yet fully understood, it is believed that the dilute slurry menstruum wets out the host particle, carrying dissolved calcium sulfate into the voids therein. The hemihydrate eventually nucleates and forms crystals, predominantly acicular crystals, in-situ in and about the voids. Crystal modifiers can be added to the slurry if desired. The resulting composite is a host particle physically interlocked with calcium sulfate crystals. This interlocking not only creates a good bond between the calcium sulfate and stronger host particle, but prevents migration of the calcium sulfate away from the host particle when the hemihydrate is subsequently rehydrated to the dihydrate (gypsum).

The material can be dried immediately before it cools to provide a stable, but rehydratable hemihydrate composite for later use. Alternatively, if it is to be directly converted into a usable product form right away, the composite can be further separated from substantially all the liquid except that needed for rehydration, combined with other like composite particles into a desired shape, and then rehydrated to a set and stabilized gypsum composite mass.

A plurality of such composite particles form a material mass which can be compacted, pressed into boards, cast, sculpted, molded, or otherwise formed into desired shape prior to final set. After final set, the composite material can be cut, chiseled, sawed, drilled and otherwise machined. Moreover, it exhibits the desirable fire resistance and dimensional stability of the gypsum plus certain enhancements (particularly strength and toughness) contributed by the substance of the host particle.

According to a preferred embodiment of the invention, the host particle is a wood fiber or chip. The process for making a composite gypsum/wood-fiber material, according to the invention, begins with mixing between about 0.5% to about 30%, and preferably between 10% to 20%, by weight, wood fibers with the respective complement of ground, but uncalcined, gypsum. The dry mix is combined with enough liquid, preferably water, to form a dilute slurry having about 70%-95% by weight water. The slurry is processed in a pressure vessel at a temperature sufficient to convert the gypsum to calcium sulfate hemihydrate. It is desirable to continuously agitate the slurry with gentle stirring or mixing to break up any fiber clumps and keep all the particles in suspension. After the hemihydrate has precipitated out of solution and recrystallized, the pressure on the product slurry is relieved when the slurry is discharged from the autoclave and, while still hot, substantially dewatered to form a filter cake. Preferably, about 70-90% of the uncombined water is removed from the slurry at this point in the process.

If the hemihydrate state of the composite material is desired, the filter cake is sustained at high temperature, for example about 180° F. (82° C.), until all remaining free water is driven off. The dried filter cake can then be broken up to form a powder or particulate material for easy handling, storing and reshaping.

Alternatively, the dewatered filter cake material can be immediately pressed, molded or otherwise shaped and allowed to cool to a temperature whereupon the calcium sulfate hemihydrate will hydrate to gypsum while still in situ in and around the wood fibers. After hydration is complete, the solidified mass is preferably dried promptly to remove any residual free water.

According to another specific embodiment of the invention, a process for producing composite gypsum/wood fiber board is provided. The process for mixing and autoclaving the gypsum and wood fiber slurry is essentially the same as described above. Certain process modifying or property enhancing additives, such as accelerators, retarders, weight reducing fillers, etc. may be added to the product slurry, preferably after it is discharged from the autoclave and before it is dewatered. The product slurry is discharged onto a continuous felting conveyor, such as the type used in paper making operations, and dewatered to remove as much uncombined water as possible. Initial laboratory experience has shown that as much as 90% of the water can be removed at this stage. While the resulting filter cake is still hot, it is wet pressed into a board of desired thickness and/or density. If the board is to be given a special surface texture or a laminated surface finish, it would preferably occur during or following this step of the process. During the wet pressing, which preferably takes places with gradually increasing pressure to preserve the product's integrity, two things happen. Additional water, for example about 80-90% of the remaining water, is removed. And, as a consequence, the filter cake is further cooled. However, it may still be necessary to provide additional external cooling to bring the temperature of the pressed mat down to below the rehydration temperature within an acceptable time. After rehydration is complete, the boards can be cut and trimmed, if desired, and then sent through a kiln for drying. Preferably, the drying temperature should be kept low enough to avoid recalcining any gypsum on the surface.

A composite gypsum/wood-fiber board made according to the foregoing process offers a synergistic combination of desirable features and properties not afforded by presently available boards. It offers improved strength, including nail and screw pull-out resistance, over conventional plasterboard. It offers greater fire-resistance and better dimensional stability in a humid environment than lumber, fiberboard, particleboard, pressed paperboard and the like. Moreover, it can be produced over a range of density and thickness. And, as the tables which follow will show, the invention can produce a composite board with a modulus of rupture (MOR) competitive with the gypsum fiberboard products produced by the earlier described prior art processes; but at lower density, and therefore lower weight and probably lower cost.

These and other features and advantages of the invention will be apparent to those skilled in the art following the more detailed discussion of the invention which follows with reference to the accompanying drawings, which form part of this specification, and of which:

Figure 1:
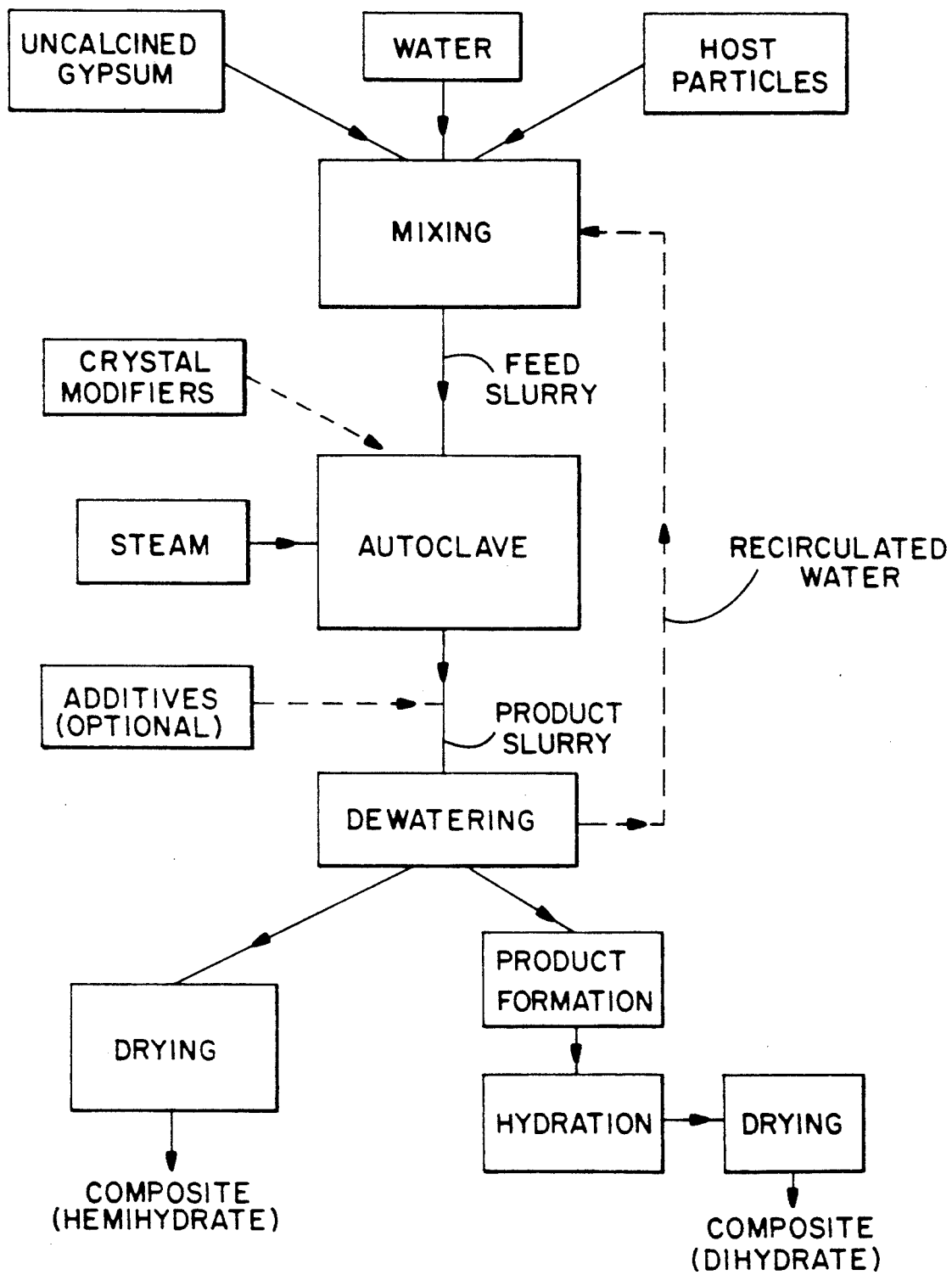
FIG. 1 is a schematic diagram of a process for forming a composite material according to one aspect of the invention.

The basic process, as schematically depicted in FIG. 1, begins with a mixing of uncalcined gypsum, host particles (wood fibers) and water to form a dilute aqueous slurry. The source of the gypsum may be from raw ore or from the by-product of a flue-gas-desulphurization or phosphoric-acid process. The gypsum should be of a relatively high purity, i.e., preferably at least about 92-96%, and finely ground, for example, to 92-96% minus 100 mesh or smaller. Larger particles may lengthen the conversion time. The gypsum can be introduced either as a dry powder or via an aqueous slurry.

The source of the cellulosic fiber may be waste paper, wood pulp, wood flakes, and/or another plant fiber source. It is preferable that the fiber be one that is porous, hollow, split and/or rough surfaced such that its physical geometry provides accessible intersticies or voids which accomodate the penetration of dissolved calcium sulfate. In any event the source, for example, wood pulp, may also require prior processing to break up clumps, separate oversized and undersized material, and, in some cases, pre-extract strength retarding materials and/or contaminants that could adversely affect the calcination of the gypsum; such as hemi-celluloses, acetic acid, etc.

The ground gypsum and wood fibers are mixed together in a ratio of about 0.5 to 30% by weight wood fibers. Sufficient water is added to make a slurry having a consistency of about 5-30% by weight solids although, so far, 5-10% by weight solids has been preferable for efficient processing and handling on available laboratory equipment.

The slurry is fed into a pressure vessel equipped with a continuous stirring or mixing device. Crystal modifiers, such as for example organic acids, can be added to the slurry at this point, if desired, to stimulate or retard crystallization or to lower the calcining temperature. After the vessel is closed, steam is injected into the vessel to bring the interior temperature of the vessel up to between about 212° F. (100° C.) and about 350° F. (177° C.), and autogeneous pressure; the lower temperature being approximately the practical minimum at which the calcium sulfate dihydrate will calcine to the hemihydrate state within a reasonable time; and the higher temperature being about the maximum temperature for calcining hemihydrate without undue risk of causing some the calcium sulfate hemihydrate to convert to anhydrite. Based on work done to date, the autoclave temperature is preferably on the order of about 285° F. (140° C.) to 305° F. (152° C.).

When the slurry is processed under these conditions for a sufficient period of time, for example on the order of 15 minutes, enough water will be driven out of the calcium sulfate dihydrate molecule to convert it to the hemihydrate molecule. The solution, aided by the continuous agitation to keep the particles in suspension, will wet out and penetrate the open voids in the host fibers. As saturation of the solution is reached, the hemihydrate will nucleate and begin forming crystals in, on and around the voids and along the walls of the host fibers.

After the conversion of the dihydrate to the hemihydrate is complete, the pressure on it is relieved when and as the slurry is discharged to a dewatering device. Optional additives can be introduced into the slurry at this stage in the process. As much as 90% of the slurry water is removed in the dewatering device, leaving a filter cake of approximately 35% water by weight. At this stage the filter cake consists of wood fibers interlocked with rehydratable calcium sulfate hemihydrate crystals and can still be broken up into individual composite fibers or nodules, shaped, cast, or compacted to a higher density. If it is desired to preserve the composite material in this rehydratable state for future use, it is necessary to dry it promptly, preferably at about 200° F. (93° C.), to remove the remaining free water before hydration starts to take place.

Alternatively, the dewatered filter cake can be directly formed into a desired product shape and then rehydrated to a solidified mass of composite calcium sulfate dihydrate and wood fibers. To accomplish this, the temperature of the formed filter cake is brought down to below about 120° F. (49° C.). Although, the extraction of the bulk of the water in the dewatering step will contribute significantly to lowering the filter cake temperature, additional external cooling may be required to reach the desired level within a reasonable time.

Depending on the accelerators, retarders, crystal modifiers, or other additives provided in the slurry, hydration may take from only a few minutes to an hour or more. Because of the interlocking of the acicular hemihydrate crystals with the wood-fibers, and the removal of most of the carrier liquid from the filter cake, migration of the calcium sulfate is averted, leaving a homogeneous composite. The rehydration effects a recrystallization of the hemihydrate to dihydrate in place within and about the voids and on and about the wood fibers, thereby preserving the homogenity of the composite. The crystal growth also connects the calcium sulfate crystals on adjacent fibers to form an overall crystalline mass, enhanced in strength by the reinforcement of the wood fibers.

Before the hydration is complete, it is desirable to promptly dry the composite mass to remove the remaining free water. Otherwise the hygroscopic wood fibers tend to hold, or even absorb, uncombined water which will later evaporate. If the calcium sulfate coating is fully set before the extra water is driven off, the fibers may shrink and pull away from the gypsum when the uncombined water does evaporate. Therefore, for optimum results it is preferable to remove as much excess free water from the composite mass as possible before the temperature drops below the level at which hydration begins.

When finally set, the unique composite material exhibits desired properties contributed by both of its two components. The wood fibers increase the strength, particularly flexural strength, of the gypsum matrix, while the gypsum acts as a coating and binder to protect the wood fiber, impart fire resistant and decrease expansion due to moisture.

Figure 2:
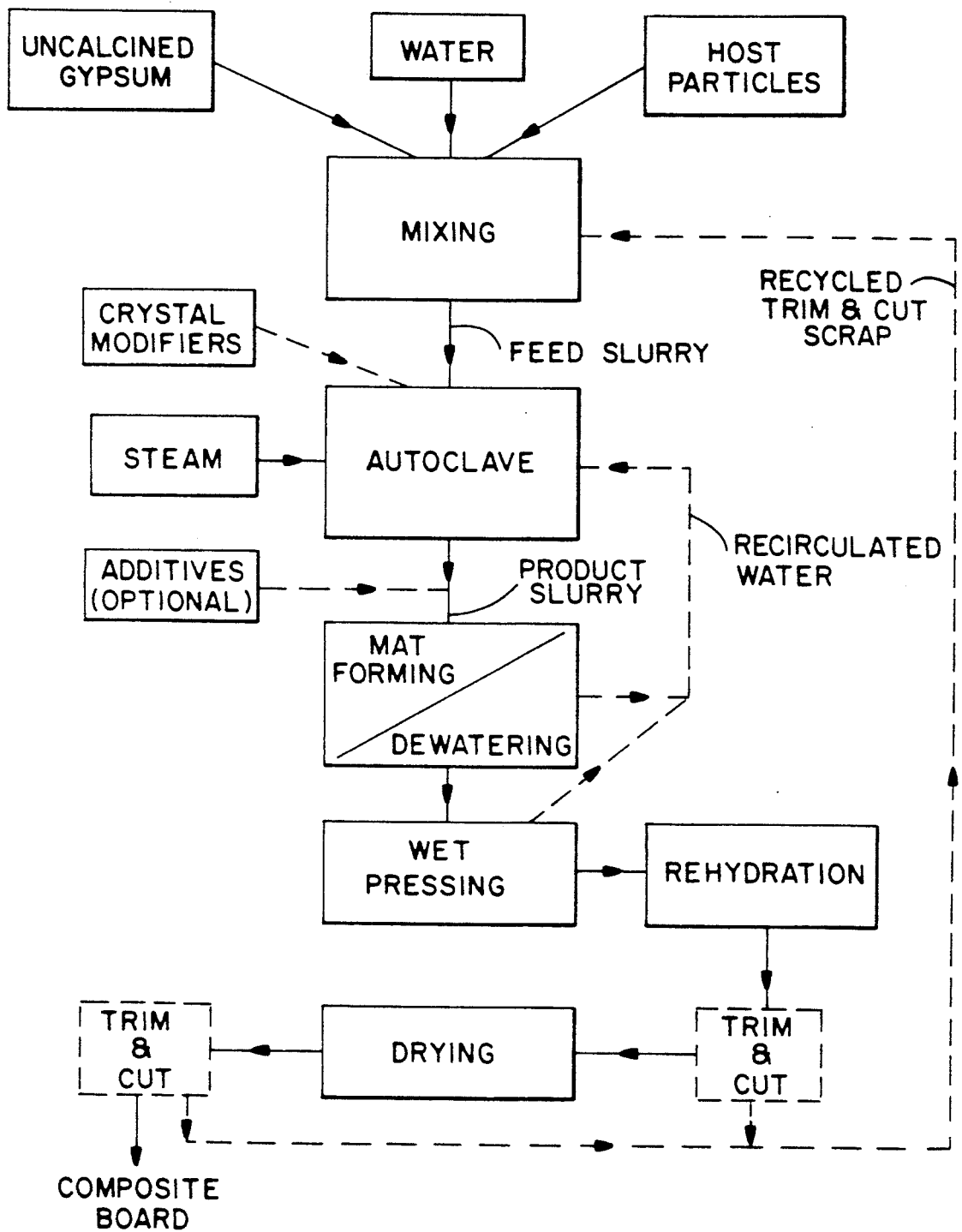
FIG. 2 is a schematic diagram of another process for forming a composite board in accordance with another aspect of the invention.

One particularly suitable application of the composite gypsum/wood-fiber material discussed above is for the production of a composite wallboard. A process for making the composite wallboard is illustrated schematically in FIG. 2.

As in the basic process of FIG. 1, the input materials consist of uncalcined gypsum particles, refined cellulose fiber, preferably wood fiber, and water. The gypsum and wood fibers are mixed in respective proportions of about 5 to 1, and added to enough water to make a slurry preferably having about 5–10% solids content. The slurry is processed in a steam autoclave, at a temperature preferably between about 285° F. and 305° F., with autogeneous pressure, for sufficient time to convert all the gypsum to fibrous calcium sulfate alpha hemihydrate. The slurry is preferably continuously mixed or stirred to break up clumps of fibers and to keep the materials in suspension as the conversion is taking place.

Again, during the autoclaving operation, it is believed that the dissolved calcium sulfate penetrates into the voids in the wood fibers and subsequently precipitates as acicular hemihydrate crystals within, on and about the voids and surfaces of the wood-fibers. When the conversion is complete, the pressure is reduced, desired additives are introduced and the slurry is discharged onto a dewatering conveyor. As much of the water is removed as possible while the temperature of the product slurry is still high. Following dewatering, and before its temperature falls below the rehydration temperature, the filter cake is wet pressed for a few minutes to further reduce the water content and to achieve the desired end product thickness and/or density. Again, aided by external cooling if necessary, the temperature of the filter cake is reduced to below about 120° F. so rehydration can take place. The rehydration recrystallizes the gypsum in place, physically interlocked with the wood fibers. The pressed board is then promptly dried at a temperature between about 110° F. (43° C.) and 125° F. (52° C.); preferably about 120° F. (49° C.). The set and dried board can be cut and otherwise finished to desired specification.

In the event it is desired to impart a special surface finish to the board, the foregoing process can accomodate modification to effect the additional step. For example, it is readily foreseeable that additional dry ground dihydrate could be added to the product slurry discharged from the autoclave, sprayed over the hot slurry as it is distributed over the dewatering conveyor, or sprinkled on the formed filter cake before it has been fully dewatered, in order to provide a smoother, lighter colored, and/or gypsum rich surface on the final board. A particular surface texture can be imparted to the filter cake in the wet pressing operation to provide a board with a textured finish. A surface laminate or coating would probably be applied after the wet pressing step and possibly after the final drying. At any rate, many additional variations on this aspect of the process will occur readily to those skilled in the art.

It is an expected additional feature of this process that, because the product is a substantially dewatered paperless board, the energy required for drying will be significantly reduced from that required in making a comparable conventional plasterboard.

EXAMPLE 1

The four samples of composite material set forth in Table 1 below were made by 4 different runs of the process described above using a batch system. In each case the input uncalcined gypsum was landplaster having 92–96% minus 100 mesh particles, and the input host particles were from thermomechanically refined, pine wood pulp.

All four samples, A, B, C and D, were subsequently pressed to form board samples. The pressing of the dewatered slurry to make the board samples was done by gradually increasing the pressure to 48, 103, 173, 242, 311 and 380 PSI in 30 second intervals. Sample A, however, was only pressed for 1½ minutes to a maximum of 173 PSI. As a result, the temperature of Sample A stayed high enough that drying occured before rehydration, and Sample A, as tested, consisted of a predominance of hemihydrate material.

On the other hand, Samples B, C & D were wet pressed for the full 3 minutes and then allowed to rehydrate to fully set dihydrate.

Density and MOR measurements were taken from 2 specimens of each of the samples, and the average of the 2 measurements is reported in Table I. Density was determined by dividing the measured weight by the measured volume, while MOR was determined according to ASTM D1037 test method.

more dilute slurry with the unrefined laboratory apparatus.

In order to give some perspective to the attributes of a composite board made in accordance with the invention, Sample B is compared with representative samples of conventional plasterboard, wood fiberboards, and commercially available gypsum/fiber combination boards, some of which, as indicated, were made by the prior art processes discussed at the outset of this specification. The intent of this comparison is solely to set the new composite board within the general environment of competitive board products. Because specific properties can vary, even within a given board type or sample, the reader should not be tempted to draw specific hard conclusions. As a final note: except where noted by an asterisk(*), all the data set forth in Table II was derived from actual measurements made in the laboratory. The asterisked exceptions represent data taken from available literature.

TABLE I

| Sample | Solids Gypsum % By Weight of Total | Solids Wood Fiber % By Weight of Total | Water % By Weight of Total Slurry | Calcining Temperature °F. | Calcining Temperature (°C.) | Press Time (min) | Hydration Time After Pressing (min) | Thickness (inches) | Density lbs/ft³ | MOR (psi) |
|---|---|---|---|---|---|---|---|---|---|---|
| A | 83.3% | 16.7% | 89.3 | 277 | (136) | 1½ | 0 | 0.688 | 38.8 | 396 |
| B | 83.3% | 16.7% | 89.3 | 284 | (140) | 3 | 60 | 0.826 | 45 | 967 |
| C | 83.3% | 16.7% | 94.3 | 295 | (146) | 3 | 60 | 1.12 | 47.6 | 841 |
| D | 89.9 | 10.1% | 92.2 | 295 | (146) | 3 | 60 | 0.558 | 56.8 | 984 |

The data in Table I reflects that a composite gypsum/wood fiber board can be made over a broad density range. In fact, samples ranging in density from about 26 lbs. per cubic foot up to above 60 lbs. per cubic foot have been made in the laboratory. Comparison of the MOR measurements with the corresponding density figures from Table I also generally supports the conclusion from other lab work that the strength of the composite board varies somewhat proportionally with the density. It is thought that the lower strength of Sample C is probably attributable to difficulties in handling the

TABLE II

| Sample | Description | Thickness (inches) | Density (lbs/ft³) | Weight (lbs/msf) | MOR (psi) | Nail Pull-Out (lbs/F) | Flame Resistance (Flame Spread Rating) |
|---|---|---|---|---|---|---|---|
| B | The Invention (17% Wood Fiber 83% Gypsum) | 0.826 | 45.0 | 3103 | 967 | 25.3 | Class I (Expected) |
| D | Plasterboard (Gypsum Core Paper Face Sheets) | 0.507 | 41.4 | 1724 | MD 932 CD 307 | 3.0 | Class I |
| E | Gypsum Wallboard* | 0.625* | 48.6* | 2535* | MD 672* CD 224 | | Class I* |
| F | Wood Fiber Board (Sheathing) | 0.553 | 17.2 | 788 | MD 450 | 5.5 | Class III or Class IV |
| G | Medium Density Wood Fiberboard | ½ (Nominal) | 49.6 | 2067 | 5718 | N.A. | Class III/IV |
| H | Plywood | ½ (Nominal) | 37.8 | 1468 | 4319 | | Class III |
| I | Prior Art Process C (Stucco/Wood Chips) | 0.506 | 70 | 2953 | 1153 | 32–100 | Class I |
| J | Prior Art Process B (Paper Fiber/Stucco) | 0.244 0.477** | 70.3 59.2 | 1433 2209 | N.A. N.A. | 50–60 40–45 | N.A. N.A. |
| K | Prior Art Process A (Paper/Stucco) | 0.499 | 75.5 | 3146 | 1062 | 42–70 | N.A. |

MD = Machine Direction
CD = Cross Direction
**Contains Perlite

Certain general observations can be drawn from the data in Table II. Of particular note; by comparing density and MOR, the new composite gypsum/wood-fiber board can provide a MOR in the range acceptable to the construction industry at lower densities than the competitive gypsum fiberboards. It can also be observed that the new composite board will provide a good fire-rating (a Class I rating being highly probable), which wood fiber boards cannot, and at the same time provide uniformly high strength in all directions and particularly greater nail pull-out strength than conventional Class I rated plasterboard.

Although, it is not reflected in the data of Table II, it is expected that the new composite board will enjoy favorable cost advantages against its most competitive products. While it is expected to cost more than the relatively inexpensive plasterboard and less than wood fiber boards, it is also expected to be less costly to produce than the other gypsum/fiber combination boards.

EXAMPLE II

The scanning electron microscope (SEM) micrographs representing FIG. 3-10 are presented to show the distinctive effects of the unique composite produced in accordance with the invention.

Figure 3:
FIG. 3 is a scanning electron microscope (SEM) micrograph (100×) of a group of wood fibers.

FIG. 3 shows a small cluster, or bunch, of naked wood fibers of the type used as the host particle in the samples of the new composite material. The viewer will note the high aspect ratio and irregular geometry of these wood-fibers. This makes them a preferred candidate for the host particle.

Figure 4:
FIG. 4 is a SEM micrograph (100×) of a group of composite gypsum/wood-fiber particles.

In FIG. 4, a similar small bunch of the same type of wood fibers is shown after having been combined with gypsum according to the inventive process. The fibers appear bulkier and substantially evenly clad with gypsum.

Figure 5:
FIG. 5 is a SEM micrograph (1000×) of the cross-section of a cluster of wood fibers.

FIG. 5 shows an isolated cluster of wood fibers, of the same type as in FIG. 3, in enlarged cross-section. This photo reveals that a wood-fiber, or host particle, as used herein is frequently actually a plurality of bound together individual hollow fibers. In this photo, the wood fiber (cluster) has been compressed somewhat. Nonetheless, it shows the typical empty hollow cores or voids in such particles.

Figure 6:
FIG. 6 is a SEM micrograph (1000×) of the cross-section of a composite particle in accordance with the invention.

FIG. 6 shows a similar enlarged cross-section of a host wood fiber which has undergone the process according to the invention. In this photo it is easy to see the acicular gypsum crystals that have grown within the hollow cores of the individual fibers, as well as around the ends and outer surface of the host particle.

Figure 7:
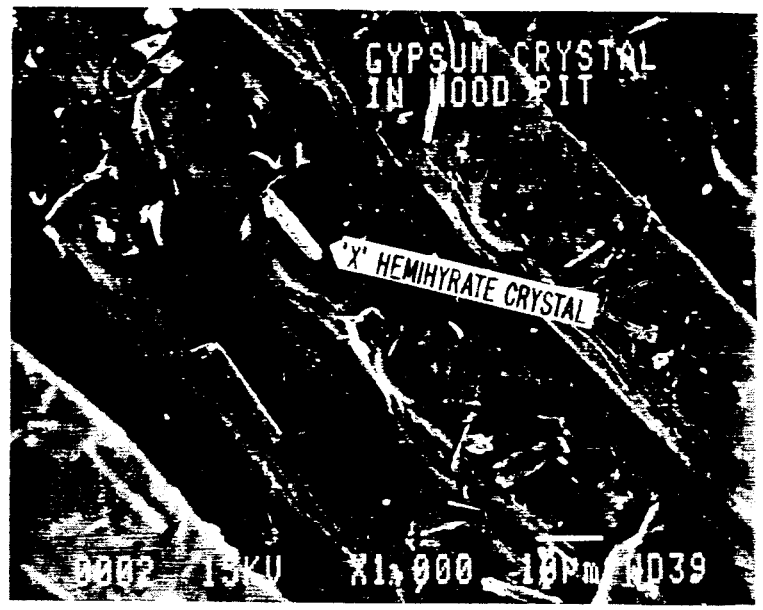
FIG. 7 is a SEM micrograph (1000×) of the surface of a wood fiber.
Figure 8:
FIG. 8 is a SEM micrograph (4000×) of the same wood fiber as in FIG. 7, showing a gypsum crystal in the aperature of a bordered pit chamber.

FIG. 7 shows the surface of a host wood-fiber and the several surface pits, or voids, therein, along with several discrete hemihydrate crystals. Note in particular the acicular crystal identified by reference letter 'X', which in the further enlarged photo of FIG. 8 is shown clearly to be growing out of one of the pits in the host fiber.

In order to make a comparison of the homogoneous composite material produced by the present invention against the more heterogeneously mixed materials of the prior art gypsum fiberboard processes, FIGS. 9(a) through 9(f) inclusive represent a series of photos (taken at increasing magnification) of a cross-section of a board made according to Prior Art Process C. For comparison, FIGS. 10(a) through 10(f) inclusive are a series of photos (taken at increasing magnification) of a cross-section of the composite material according to the invention.

Figure 9A:
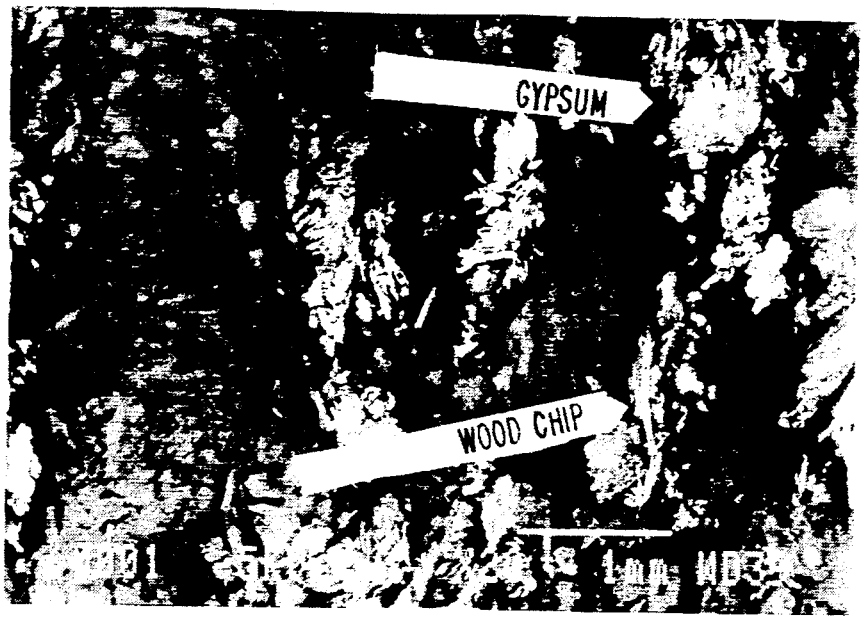
FIGS. 9(a), 9(b), 9(c), 9(d), 9(e) and 9(f) are SEM micrograph (20×, 100×, 200×, 500×, 1000× and 1000× respectively) of a cross section of a gypsum/wood-chip board made by a prior art process.
Figure 9B:
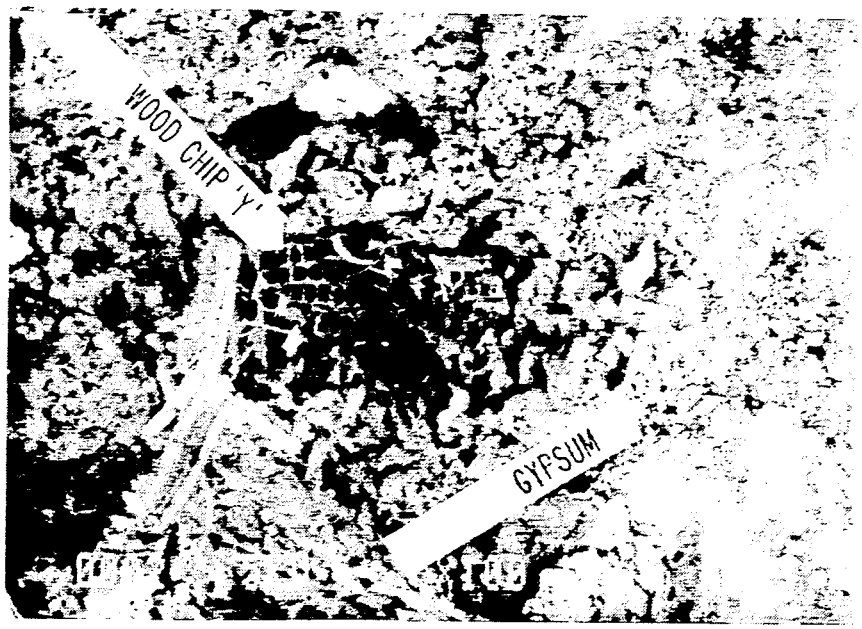
Figure 9C:
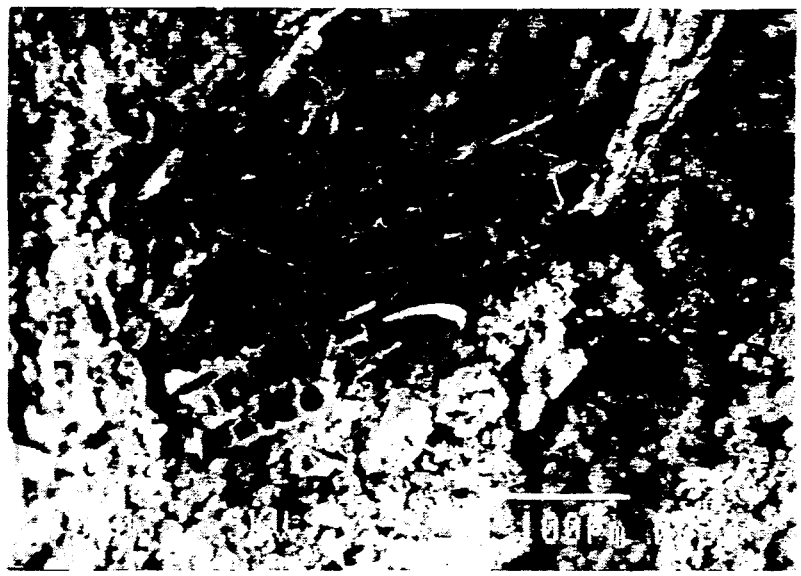
Figure 9D:
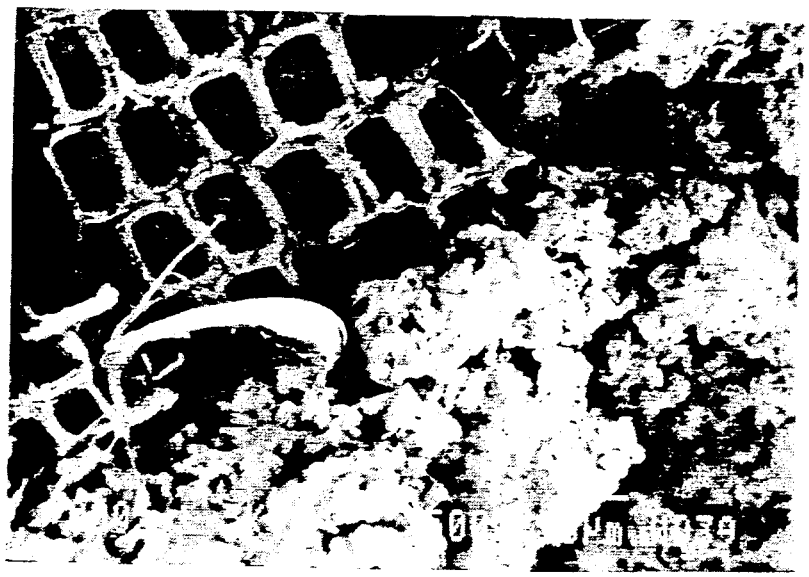
Figure 9E:
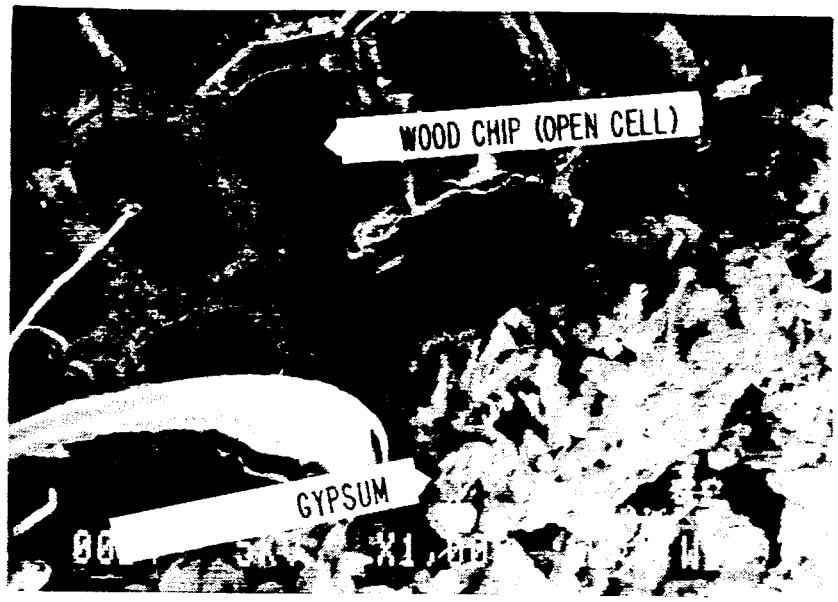
Figure 9F:
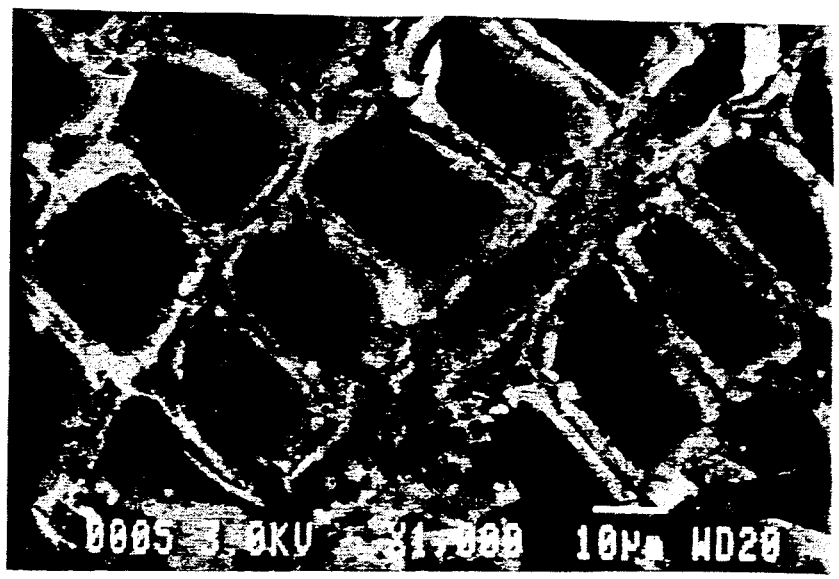

Looking at FIG. 9(a), the wood chips appear quite distinct from the surrounding mass of gypsum. Looking next at FIG. 9(b), the gypsum appears to be an amorphous mass with the wood chip buried therein like a filler particle. By viewing FIGS. 9(c) through 9(f) progressively, one focuses in on the particular wood chip indicated as 'Y' in FIG. 9(b). In doing so, it becomes more apparent that the gypsum mass is discrete from the embedded wood chip. Finally, referring particularly to FIG. 9(f), the absence of any gypsum in the open cells of the wood chip is noted.

Figure 10A:
FIGS. 10(a), 10(b), 10(c), 10(d) and 10(e) are SEM micrograph (50×, 100×, 500×, 1000× and 2500× respectively) of a cross-section of a composite wallboard made in accordance with the invention.
Figure 10B:
Figure 10C:
Figure 10D:
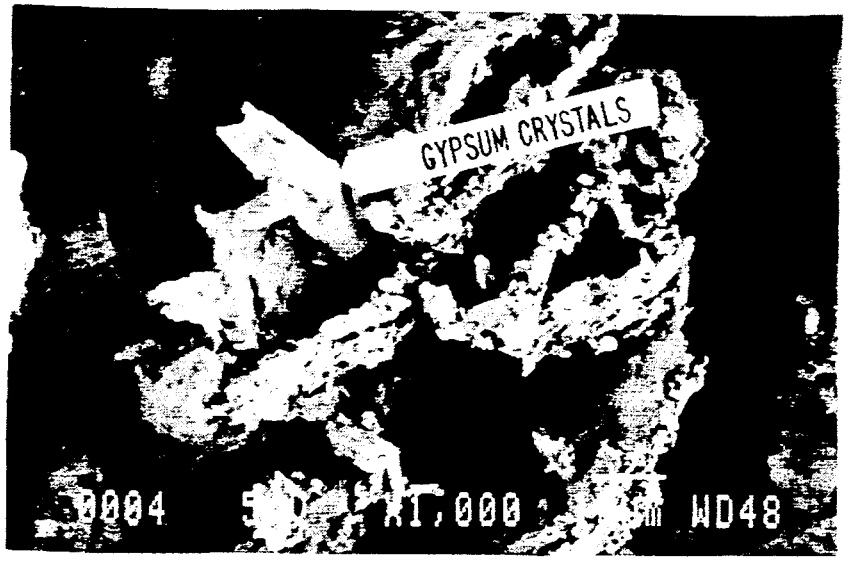
Figure 10E:
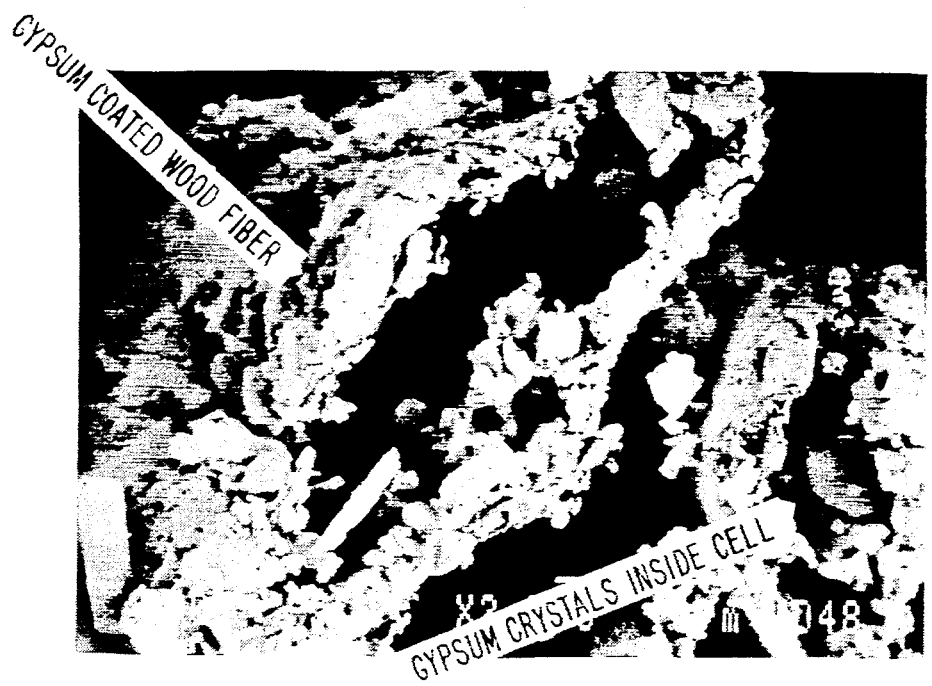

Looking now at FIGS. 10(a) and 10(b), the more homogeneous nature of the new composite material is apparent; the recognizable gypsum crystals being clustered around and attached to the various wood fibers. Viewing FIGS. 10(c) through 10(e) successively, one focuses in on a couple of wood fibers and the numerous gypsum crystals formed on and about the ends, as well as within the hollow core, of those wood fibers.

As these photos clearly show, when gypsum and wood fibers are processed in accordance with the invention, by calcining the gypsum in a dilute slurry, under pressure, with the host wood fibers present and substantially dewatering the slurry before rehydrating the gypsum, the gypsum can be recrystallized in and about the voids in the wood fibers and interlocked therewith to provide a synergistic composite having useful advantages. The resulting composite material has been demonstrated to offer particular advantage for a wallboard.

Although the invention has been discussed in connection with particular illustrative embodiments, other embodiments, modifications, variations, and improvements in the composite material and process for making it, as well as other beneficial uses of the resulting material, will undoubtedly occur to those skilled in the art once they have become familiar with the invention as hereafter claimed.

I claim:

1. A process for making a composite material, comprising:
    mixing ground gypsum with host particles of a reinforcing material and sufficient liquid to make a dilute slurry consisting of at least about 70% by weight liquid;
    calcining the gypsum, in the presence of the host particles, by heating the dilute slurry under pressure, to form acicular calcium sulfate alpha hemihydrate crystals; and
    separating a major portion of the liquid from the calcined gypsum and host particles before rehydrating the hemihydrate back to gypsum.

2. A process for making a composite material, as recited in claim 1, which further includes continuously agitating the slurry while the gypsum is being calcined and the hemihydrate crystals are forming.

3. A process for making a composite material, comprising:
    mixing ground gypsum and a plurality of host particles together with water to form a slurry, said host particles being generally insoluble in said water but having voids on their surfaces and/or within their bodies penetrable by the slurry menstruum containing suspended and/or solubilized gypsum and said slurry being sufficiently dilute to wet out said host particles with slurry menstruum and to foster the growth of acicular calcium sulfate alpha hemihydrate crystals when heated under pressure;
    heating the slurry under pressure to a temperature sufficient to calcine the gypsum to calcium sulfate hemihydrate;
    maintaining the slurry heated and under pressure while allowing the calcium sulfate molecules to nucleate and form crystals in-situ in and about the voids in the host particles;
    relieving the pressure and dewatering the slurry; and
    drying the dewatered solids to remove substantially all the remaining free water and stabilize the calcium sulfate while still physically interlocked with the host particles.

4. A process for making a composite material as in claim 3, which further includes maintaining the temperature of the slurry and the dewatered solids at a temperature above the temperature at which the calcium sulfate hemihydrate will rehydrate to calcium sulfate dihydrate until substantially all the excess free water has been removed by dewatering and drying.

5. A process for making a composite material as in claim 3, which further includes continuously agitating the slurry while it is heated and until the calcination of the gypsum is substantially complete.

6. A process for making a composite material as in claim 3, which includes maintaining the temperature of the slurry at about 200° F. until it has been substantially dewatered.

7. A process for making a composite material as in claim 4, which further includes maintaining the temperature of the slurry above about 200° F. until it has been substantially dewatered and dried.

8. A process for making a composite material as in claim 3, wherein the host particles are cellulosic particles from the group consisting of fibers, chips and flakes.

9. A process for making a composite material as in claim 3, wherein the host particles each have penetrable voids over a substantial portion of their bodies.

10. A process for making a composite material as in claim 3, which further includes the step of cooling the dewatered solids at a temperature below that at which the calcium sulfate hemihydrate crystals will rehydrate to calcium sulfate dihydrate and allowing such rehydration to take place before drying the dewatered mass to remove the remaining free water.

11. A process for making a composite material as in in claim 3, further including the step of dewatering the heated slurry to form a filter cake, then wet pressing the filter cake and allowing the temperature of the filter cake to fall below the temperature at which the calcium sulfate hemihydrate rehydrates to gypsum crystals before drying it.

12. A process for making a composite material as in claim 3, further including the step of forming a mat from the heated slurry and, after substantially dewatering the mat, wet pressing the mat to compress the material to a predetermined thickness or density.

13. A process for making a composite material as in claim 12, further including allowing the temperature of the compressed material to fall below the temperature at which the calcium sulfate will rehydrate to gypsum and allowing such hydration to continue until gypsum crystals physically interlocked with the host particles are joined with like crystals to form an integral homogeneous mass and then drying the mass to remove the remaining free water.

14. A process for making a board of composite material, comprising:
mixing ground gypsum and host particles together with sufficient water to form a slurry, said host particles each having voids on its surface and/or within its body penetrable by the slurry menstruum containing suspended and/or dissolved gypsum and said slurry being sufficiently dilute to substantially wet out the penetrable voids in the host particles and to foster the formation of acicular calcium sulfate alpha hemihydrate crystals when heated under pressure;

heating the slurry in a pressure vessel, with continuous agitation, to a temperature sufficient to calcine the gypsum to calcium sulfate alpha-hemihydrate, and maintaining the slurry at such temperature until at least some calcium sulfate hemihydrate has substantially crystallized in and about the voids in the host particles;

discharging the heated slurry onto a flat porous forming surface and removing a substantial portion of the water from it to form a filter cake;

pressing the filter cake to form a board and to remove additional water therefrom before the temperature of the board falls below the temperature at which the calcium sulfate hemihydrate will rehydrate to gypsum;

cooling the board to below the rehydration temperature and allowing the calcium sulfate hemihydrate to rehydrate to gypsum; and drying the board to remove the remaining free water.

15. The process as in claim 14, wherein the dilute slurry comprises ground gypsum and discrete ligno-cellulosic host particles, said celulosic particles each having voids penetrable by the slurry menstruum over a substantial portion of their bodies.

16. The process as in claim 15, wherein the host particles are wood fibers selected from the group consisting of: chemically refined wood pulp, mechanically refined wood pulp, thermo-mechanically refined wood pulp and combinations of the foregoing.

17. The process as in claim 16, wherein the solids in the slurry comprise about 0.5-30% by weight wood fibers.

18. The process as in claim 17, wherein the solids in the slurry comprise between 10-20% by weight wood fibers.

19. The process as in claim 15, wherein the dilute slurry comprises at least about 40-95% by weight water.

20. The process as in claim 14, wherein the dilute slurry comprises at least about 70-95% by weight water.

21. The process as in claim 14, wherein the slurry is heated in the pressure vessel to a temperature between about 285° F. and about 305° F.

22. The process as in claim 14, wherein the temperature of the heated slurry is maintained at a temperature above about 200° F. until it has been substantially dewatered and wet pressed into a board.

23. The process as in claim 22, wherein about 90% of the uncombined water is removed from the slurry by the combined dewatering and wet pressing steps.

24. The process as in claim 22, wherein the board formed by pressing the heated filter cake is cooled to a temperature on the order of 120° F. to effect rehydration of the calcium sulfate hemihydrate before it is finally dried.

25. The process as in claim 14, wherein the board is dried at a sustained temperature between about 110° F. to about 125° F.

26. The process as in claim 14, wherein the dewatered filter cake is pressed to form a board, which after hydration and drying, has a density between 40-50 pcf.

27. A method of making a composite material which includes the steps of calcining gypsum under heat and pressure in a liquid medium containing suspended host particles having voids on their surfaces and/or within their bodies penetrable by said medium under conditions which foster the nucleation and growth of acicular calcium sulfate alpha hemihydrate crystals in-situ in and about voids in such host particles.

28. A method of making a composite gypsum and wood fiber material which includes the steps of
   a) suspending a mixture of ground gypsum and wood fibers having hollows, fissures, pores, pits and/or other irregular surfaces over a portion of their body in a continously agitated aqueous medium;
   b) adding an amount of soluble gypsum in excess of that required to saturate the aqueous medium, wherein a portion of the gypsum is solubilized and a portion is suspended in the continuously agitated medium;
   c) heating the aqueous medium under pressure to precipitate the solubilized gypsum from solution as calcium sulfate alpha hemihydrate; and
   d) maintaining the reaction condition of step (c) for a sufficient period of time such that the growth of acicular calcium sulfate alpha hemihydrate crystals in, on and about the hollows, fissures, pores, pits and/or other irregular surfaces of the wood fibers is fostered.

29. A composite material, comprising:
   a host particle of non-gypsum material and having voids on its surfaces and/or within a portion of its body; and
   calcium sulfate acicular alpha hemihydrate crystals at least some of which have been formed in-situ in and about the voids in the host particle, forming a calcium sulfate crystalline matrix physically interlocked with the host particle.

30. A composite material as recited in claim 29, wherein the host particle is in the form of a chip, a flake or a fiber.

31. A composite material as recited in claim 29, wherein the host particle is a ligno-cellulosic substance.

32. A composite material as recited in claim 31, wherein the host particle is a wood fiber.

33. A composite material comprising:
   a plurality of host particles of cellulosic material, each particle having voids on its surface and/or within a portion of its body; and calcium sulfate alpha hemihydrate crystals at least some of which have been formed in-situ in and about a significant portion of the voids in the host particles, whereby the host particles are physically interlocked with the calcium sulfate crystals.

34. A composite material as in claim 33, wherein the calcium sulfate hemihydrate crystals are acicular crystals.

35. A composite material as recited in claim 33, wherein the host particle is a wood fiber.

* * * * *